United States Patent Office 2,973,990
Patented Mar. 7, 1961

2,973,990

SLIDABLE ROOF STRUCTURE FOR VEHICLES

Johannes Werner, Offenbach (Main), Germany, assignor to H. T. Golde G.m.b.H. & Co. K.G., Frankfurt am Main, Germany Filed July 19, 1957, Ser. No. 672,990

Claims priority, application Germany Mar. 9, 1957

5 Claims. (Cl. 296—137)

This invention relates to canopy frames and also to method of installing the same.

More particularly, the invention relates to the provision of frames for roof linings especially intended for vehicles in which the roofs are slidable. The method provided in accordance with the invention is concerned with the installation of the improved frames.

It is an object of the invention to avoid the necessity of first installing a frame and subsequently having to attach the lining thereto. This object of the invention advantageously avoids the inconveniences occasioned by unaccessible working spaces.

It is a further object of the invention to provide an improved canopy frame and method for the installation thereof which greatly facilitates the installation of a roof on a vehicle with its associated accessories.

Another object of the invention is to provide an improved canopy frame the manufacture of which is simple and economical.

Still another object of the invention is to provide for the lining of a roof or cover slidably insertable between fixed guides or supports.

Briefly, the invention contemplates the provision of a flexible canopy frame which is flexed or troughed for insertion between fixedly spaced guides or supports and which is subsequently braced by the use of detachable rigid members.

It will be appreciated that with a roof or cover arranged in position between fixed supports in cramped working spaces that difficulties in installing a lining for the roof may be encountered. It will, however, be evident from the detailed description which follows how such difficulties can be avoided.

The detailed description is accompanied by a drawing illustrating a preferred embodiment of the invention and in which.

Figure 1:
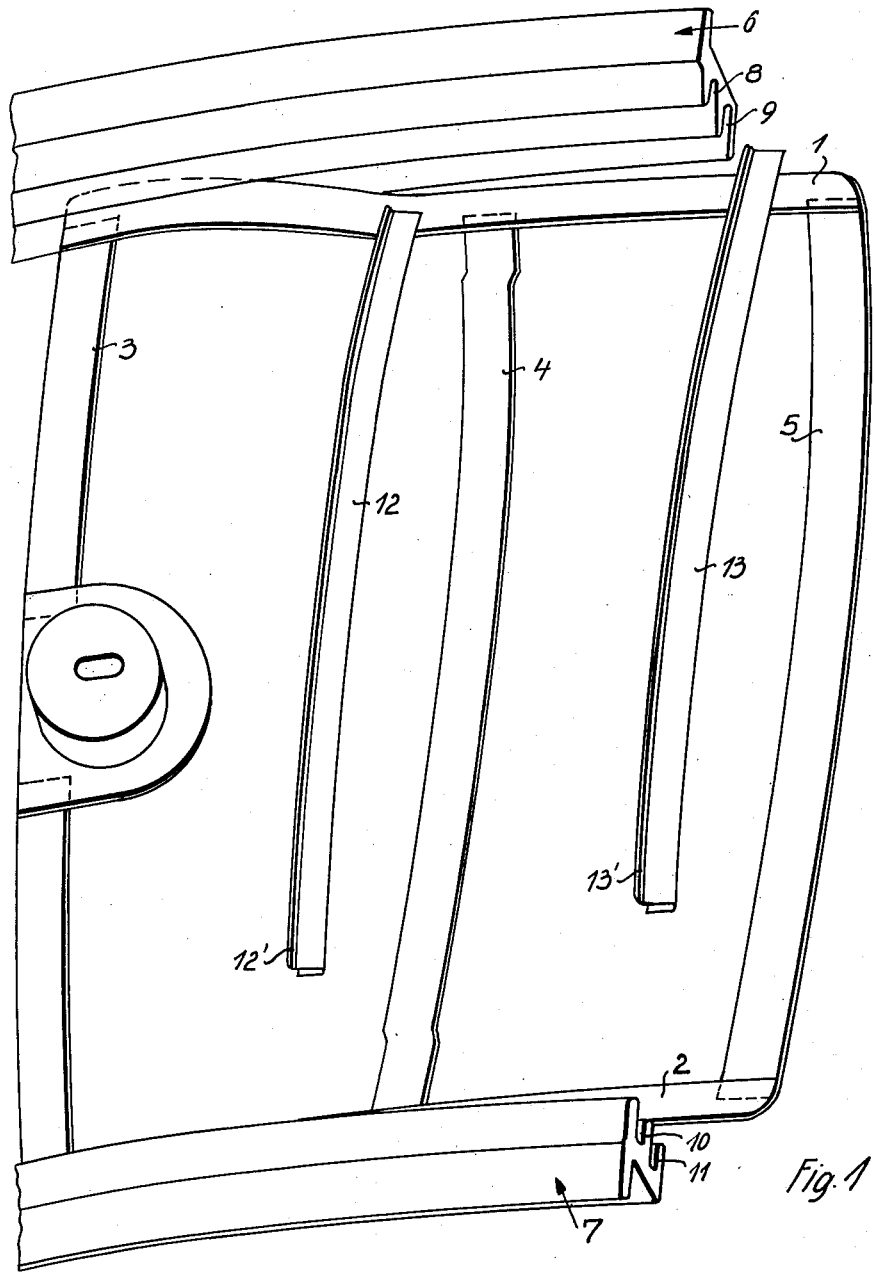
Figure 1 illustrates a flexible canopy frame positioned intermediate spaced guides and detached rigid members adapted to brace the frame.

The canopy frame referred to above includes two spaced and parallel lateral members or beams 1 and 2 (Figs. 1 and 2) which are connected by cross-members or pieces 3, 4, and 5. These members form a framework to which a flexible lining (not shown) of fabric, plastic or the like can be fastened in known manner prior to the installation of the frame.

For supporting the roof or cover and slidably receiving the same, there are provided two fixedly spaced guides or rails 6 and 7. These guides which also function as supports can be provided with E-shaped cross-sections the upper recesses 8 and 10 of which can receive the roof or cover unit, the lower recesses 9 and 11 being provided to accommodate the canopy frame for the roof lining.

Beams 1 and 2 are flexible as illustrated in Fig. 1. Consequently, these members can be made from a spring steel. The cross-members 3, 4, and 5 are also flexible and thus are also made from a flexible material such as spring steel.

With the roof in place, the canopy frame is inserted intermediate the guides 6 and 7 by troughing the elements 3–5 so that the effective width of the frame is reduced. The frame can then be conveniently inserted into position so that when straightened it extends into the recesses 9 and 11.

For securing the frame firmly in position, rigid members 12 and 13 are provided. Firstly, it is to be observed that the cross-members 3–5 are of a material which is resilient as well as flexible. Thus, the frame will tend to spring into position, the extended lengths of the cross-members urging the lateral members against the guides. In any event, the rigid members 12 and 13 will firmly brace the associated cross-members so as to give the same their final operational form.

Inasmuch as the cross-members 3–5 are provided in the preferred embodiment as planar strips, the rigid members 12 and 13 may be of spring steel and shaped to define U-shaped channels for readily accommodating the strips. The engagement between these members can be either frictional or more positive such as through the use of screws or bolts.

Figure 2:
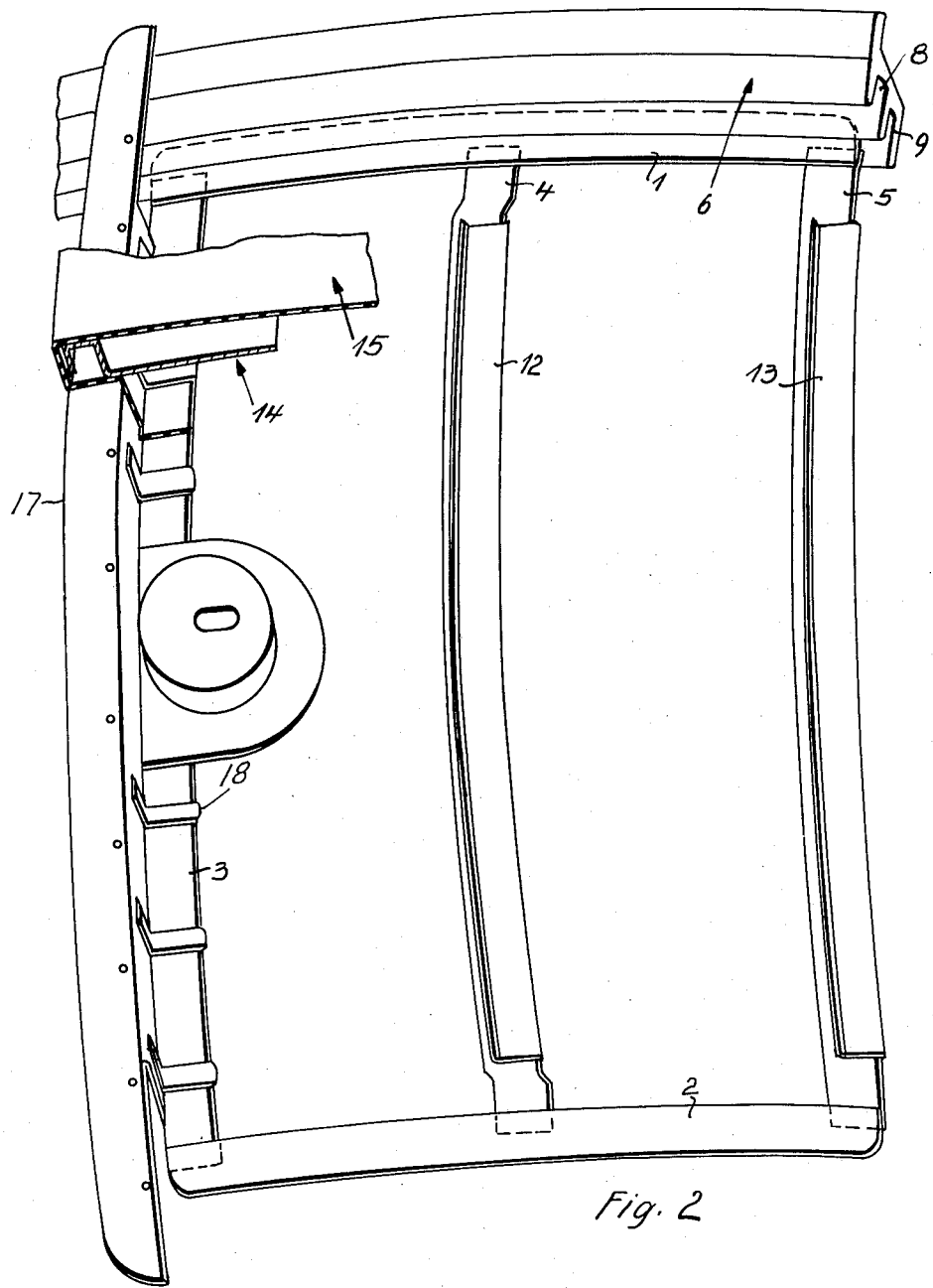
Figure 2 illustrates the apparatus of Fig. 1 with the frame engaged by the spaced guides and the rigid members bracing the frame to lock the same in position.

In accordance with the invention, not all of the cross-members need be provided with bracing elements. In Fig. 2 is shown, for example, a roof frame portion 14 on which is mounted the roof 15, both of these elements being shown only in part. The front brace 17 of the roof unit can be utilized to provide the bracing for one of the cross-members such as, for example, the cross-member 3. To effect this bracing, L-shaped elements 18, previously installed, can be employed which can be fastened to the element 3 by screws or bolts (not shown).

To assist in the bracing of the canopy frame, rigid members 12 and 13 can be provided with flanges 12' and 13'. The thickness and material from which these bracing members are made will also determine the ultimate rigidity of the frame.

When the canopy frame is to be dismounted, the connection between the cross-member 3 and the roof unit can be undone and all that remains to be accomplished is the removal of the braces 12 and 13. The canopy frame can then be troughed by compressing the cross-members in a lateral sense and the entire frame can be removed quite readily.

Figure 3:
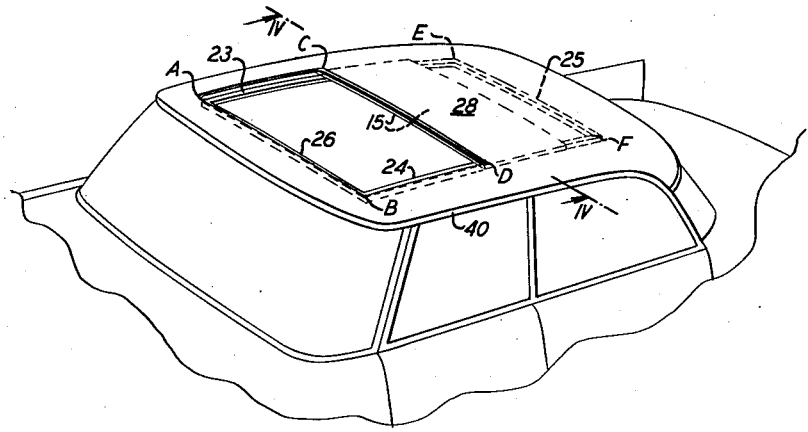
Figure 3 is a perspective view of a vehicle which may embody the invention.
Figure 4:
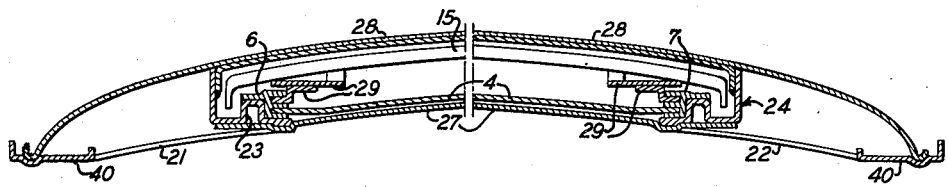
Figure 4 shows a section taken along the line IV—IV of Figure 3.
Figure 5:
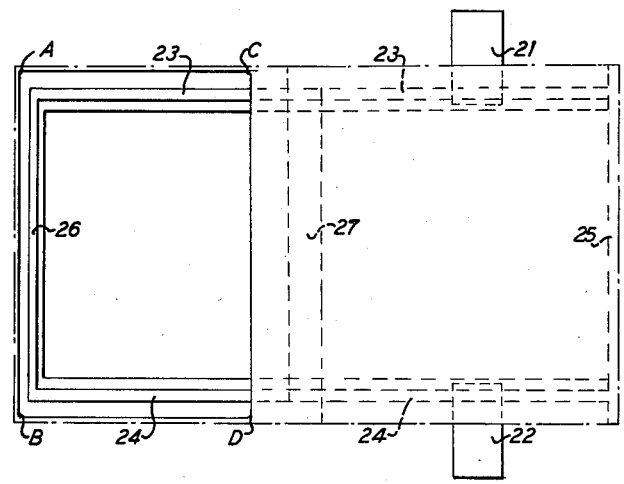
Figure 5 is a diagrammatic top view of the roof frame.

Prior to the installation of a sliding cover (see Figs. 3–5), the metallic vehicle roof is cut out along lines A—B—C—D and is trimmed. A guide frame 23, 24, 25, 26 (Fig. 5) for the sliding cover 15 is then inserted and rigidly connected to the roof 28 by welding. In the rear region 23, 24, the frame is positioned on supports 21, 22, which produce a connection between the frame members 23, 24 and the frame 40 (Fig. 4) of the roof of the body. The lateral longitudinal members 23, 24 are so constructed that they are able to receive channel members 6, 7 for guiding the cover 15. The illustrated embodiment provides for E-shaped, light-metal members 6, 7 having an outwardly directed flange for fastening to the frame members 23, 24. The top legs of the right and the left members serve to receive two guide shoes 29 for the rigid sliding cover 15.

The guide frame comprises cross bracings. In the illustrated embodiment are employed three cross-members, 26 in front, 27 approximately in the center, and 25 at the back; the cross-members 25 and 27 may also be connected to form a plate which fills the portion of the frame located beyond the opening in the roof. The area between the cross-member 27 and the cross-member 25 is covered with a suitable material such as, for example, sheet metal, paperboard or plastic.

The rigid sliding cover 15 is slightly concave and its recess comprises the structural members required for closing the roof and, in addition, fastening elements for the guide shoes 29. These necessary built-in members are so covered that they are not visible from the interior of the vehicle. For this purpose, the invention provides, underneath the cover 15, for a canopy frame which is also displaceable and is covered with textile material or the like.

It will be understood that the illustrated apparatus is shown as exemplary only. Thus, for example, the guides 6 and 7 can be of various shapes, the lateral members then being provided with whatever configurations are required for purposes of mating with the guides. Moreover, the cross-members and associated rigid members can be of various configurations.

In fact, there will now be obvious to those skilled in the art many modifications and variations of the apparatus set forth which do not depart essentially from the scope of the invention as defined in the following claims.

What is claimed is:

1. A canopy frame for supporting a roof lining for a vehicle having a sliding cover and adapted for being slidably supported between fixed guides adjacent a roof, said frame comprising lateral members of flexible material adapted to slide in said guides, cross members of flexible material connecting said lateral members, and at least one substantially U-shaped member of predetermined form and of rigid material internally accommodating one of said cross members, said U-shaped member extending over a major part of the length of said one cross member and imparting said predetermined form thereto, the flexibility of said lateral and cross members facilitating mounting of the frame prior to engagement of the U-shaped member with said one cross member.

2. A frame as claimed in claim 1 comprising a flange on said U-shaped member to strengthen the same.

3. A frame as claimed in claim 1 wherein said U-shaped member is of spring steel.

4. A frame as claimed in claim 1 wherein a U-shaped member is provided for less than all of said cross members, the remainder of said cross members being attached to said roof.

5. A frame as claimed in claim 1 wherein said cross members are resilient.

References Cited in the file of this patent

UNITED STATES PATENTS

| | | |
|---|---|---|
| 1,710,874 | Hoch | Apr. 30, 1929 |
| 1,765,639 | Tucker | June 24, 1930 |
| 1,784,180 | Delale | Dec. 9, 1930 |
| 2,062,177 | Herron | Nov. 24, 1936 |
| 2,083,030 | Mackay | June 8, 1937 |
| 2,338,309 | Votypka | Jan. 4, 1944 |
| 2,594,910 | Germann | Apr. 29, 1952 |

FOREIGN PATENTS

| | | |
|---|---|---|
| 582,576 | Germany | Aug. 17, 1933 |
| 595,436 | Germany | June 20, 1934 |
| 650,859 | Great Britain | Mar. 7, 1951 |
| 751,332 | Great Britain | June 27, 1956 |
| 756,392 | Great Britain | Sept. 5, 1956 |